United States Patent
Walker

[15] 3,668,151
[45] June 6, 1972

[54] HIGH STRENGTH CATALYST PELLETS

[72] Inventor: Darrell W. Walker, Bartlesville, Okla.

[73] Assignee: Phillips Petroleum Company

[22] Filed: May 28, 1969

[21] Appl. No.: 828,772

[52] U.S. Cl. .................................. 252/466, 252/463, 23/52
[51] Int. Cl. ........................................................ B01j 11/22
[58] Field of Search .............. 260/680, 683.3; 252/466, 463; 23/52

[56] References Cited

UNITED STATES PATENTS

| | | | |
|---|---|---|---|
| 3,531,543 | 9/1970 | Clippinger | 260/683.3 |
| 2,269,508 | 1/1942 | Barton | 23/52 |
| 3,470,262 | 9/1969 | Michaels | 260/680 |
| 3,461,183 | 8/1969 | Hepp | 260/680 |
| 3,461,177 | 8/1969 | Box | 260/673.5 |
| 3,502,739 | 3/1970 | Begley | 260/680 |
| 3,511,883 | 5/1970 | Jenkins | 260/673.5 |

*Primary Examiner*—Daniel E. Wyman
*Assistant Examiner*—Philip M. French
*Attorney*—Young and Quigg

[57] ABSTRACT

A method of preparing a high strength catalyst pellet is disclosed which comprises calcining particulate ZnO admixed with particulate $Al_2O_3$. Additionally, a catalytic process using a prepared high strength catalyst is disclosed.

4 Claims, No Drawings

HIGH STRENGTH CATALYST PELLETS

This invention relates to a method of preparing high strength zinc aluminate catalyst. In another aspect this invention relates to a process for using the prepared zinc aluminate as a catalyst.

In recent years catalytic reactions have assumed great industrial importance. In many of these catalytic reactions the catalyst is designed to exist in discrete forms or pellets. A problem exists when the pellets break up into smaller fragments during the catalytic process. Upon breaking up, or fragmenting, of the pellets the smaller particles can plug the catalytic reactor itself such as when smaller fragments fill up the catalyst support screen in a fixed bed reactor, or the smaller particles can escape from the catalyst retention area and contaminate downstream equipment and products. Thus, it is highly desirable to eliminate catalyst pellet fragmentation in catalytic reactors.

One embodiment of this invention comprises a high strength catalyst pellet made by calcining particulate ZnO admixed with particulate $Al_2O_3$. Another embodiment of this invention comprises a catalytic process using the prepared high strength catalyst.

Accordingly, it is an object of this invention to prepare a high strength catalyst pellet. Additionally, it is an object of this invention to conduct a catalytic reaction utilizing a high strength catalyst pellet. Furthermore, it is an object of this invention to reduce the operating costs of a catalytic reaction by eliminating downstream cleanup or reactor fouling due to catalyst pellet fragmentation. In addition, it is an object of this invention to minimize off-specification product by retaining catalyst in the catalyst retention area. Other objects, advantages and features of this invention will be readily apparent to those skilled in the art from the following description and appended claims.

The particulate ZnO useful with this invention can comprise any particulate ZnO having an average particle diameter in the range from about 0.1–1,000 microns; however, entirely satisfactory results are obtained when the ZnO average particle diameter is in the range of about 40–900 microns and in a preferred embodiment an average particle diameter of about 300 microns is used.

The $Al_2O_3$ used in this invention can comprise any flame-hydrolyzed $Al_2O_3$ wherein the average particle diameter is in the range from about 0.01–1 micron. Additionally, satisfactory results are obtained when the $Al_2O_3$ is in the range from about 0.025–0.75 micron average particle diameter and particularly satisfactory results are achieved when the average particle diameter is 0.03 micron. Thus, according to this invention, the term flame-hydrolyzed refers to an $Al_2O_3$ made by the hydrolysis of aluminum chloride in the flame process such as $Al_2O_3$ sold commercially by the Cabot Corporation, Boston, Mass., under the trademark ALON said ALON comprising a mixture of different crystalline forms of alumina, said alumina being predominantly of the gamma modification.

According to the invention, the particulate ZnO and particulate $Al_2O_3$ are initially mixed together. The ratio of ZnO to $Al_2O_3$ can be in the molar range from 1/0.7–1/1.1 and in one embodiment about 0.52 mol of ZnO was admixed with about 0.50 mol of $Al_2O_3$.

According to this invention, the two particulate materials can be mixed in any manner that will insure satisfactory admixing, specifically, a ball mixer or a ball mill can be used. In one embodiment deionized water was used to facilitate admixing.

In one embodiment of the invention, the particulate ZnO—$Al_2O_3$ mixture is dried prior to pelletizing. Any drying technique that will result in a sufficiently dry product to be useful in this invention is satisfactory; however, in one embodiment, the deionized water used as a wetting agent was removed by drying at 100° C. for 16 hours.

According to this invention, the admixture is pelletized according to any manner convenient to the user. If desired, various lubricants and other pelletizing additives may be added.

The pellets of this invention are calcined for a sufficient time and at a sufficient temperature to result in a pellet of high strength. In one embodiment, the pelletized admixture can be calcined from about 0.1–30 hours at a temperature in the range from about 600°–1,500° C., while in another embodiment, the pelletized admixture was calcined from about 1–30 hours at a temperature from about 800°–1,200° C. In an additional embodiment, the pellets can be calcined at about 1,000° C. for about 16 hours.

The catalyst pellets of this invention can be used directly as a catalyst after calcining or can be impregnated with other materials and used as a catalyst. Any suitable catalyst can be used to impregnate the calcined pellet. Specifically, a metal catalyst can be used and, more specifically, satisfactory results are obtained when the calcined pellet is impregnated with a metal selected from the group consisting of platinum, lithium, and tin and mixtures thereof. In one embodiment, impregnation was accomplished by sufficient aqueous solution to result in the impregnated pellet containing, based on the weight of the impregnated pellet, about 0.25 weight per cent platinum, about 0.25 weight per cent lithium, and about 0.15 weight per cent tin.

After the calcined pellets have been impregnated, if desired, they can be dried. Any drying which will result in successful operation of the invention is satisfactory.

Thus, according to this invention, the basic steps are combining particulate ZnO and particulate $Al_2O_3$, pelletizing the admixture, and calcining the pellets. Obviously, many other steps are fully within the scope of this invention, some of which are noted specifically, such as admixing the particulate materials in the presence of water or other suitable lubricant, drying the admixed product, impregnating the pellets with an additional catalyst, drying the impregnated pellets, and the like.

According to this invention, the calcined products can be used in any catalytic reaction where the calcined pellets catalyze conversion. Specifically, the catalysts of this invention, both unimpregnated and impregnated with additional catalyst materials, are useful for the dehydrogenation of hydrocarbons and, more specifically, for the dehydrogenation of n-butane to olefins and diolefins. The catalytic reaction conditions can comprise any conditions that will result in the product desired with the selected feedstock. In the specific embodiment where n-butane is converted to olefins and diolefins, 635° C. and 85 psig were found to be entirely satisfactory.

Thus, according to this invention, a high strength catalyst pellet is produced. The term "high strength" means a pellet of the catalytic material described in this application which exhibits resistance to crushing. A convenient method of testing a crushable discrete particle for resistance to crushing is to utilize the device disclosed in U.S. Pat. No. 2,976,723 to Eddy on Mar. 28, 1961, herein incorporated by reference, wherein a pellet is placed between two tangentially impinging surfaces and the force in pounds necessary to crush the pellet is measured. According to this invention, the term high strength indicates a pellet tested according to the following apparatus exhibiting a crush strength in excess of 15 pounds, although higher crush strengths are fully within the scope of this invention and, in fact, crush strengths in excess of 25 pounds are demonstrated in the appended examples.

EXAMPLE I

In order to demonstrate the preparation of a catalyst not exhibiting the high strength character of this invention, 3,981 grams of a hydrated zinc nitrate was admixed with 10,228 grams of a hydrated aluminum nitrate in 50 gallons of deionized water. Concentrated ammonia water (28 weight per cent $NH_3$) was added with stirring to a pH of 7 to precipitate an intimate mixture of the corresponding hydroxides. The precipitate was filtered, washed, and spray dried to a fine powder. The spray dried powder was tableted, calcined 12 hours at 1,250° C., and tested for crush strength by utilizing the apparatus disclosed in U.S. Pat. No. 2,976,723 and found to be within the range from 5 to 8 pounds. The pellets were then crushed to 20–40 mesh and impregnated with sufficient aqueous solution to result in the impregnated pellet containing, based on the weight of the impregnated pellet, 0.25 weight per cent platinum, 0.25 weight per cent lithium, and 0.15 weight per cent tin. The pellets were dried and tested for catalytic dehydrogenation activity at about 1,050° F. by introduction into a laboratory catalytic reactor operating at conditions of 1,235 v/v/hours normal butane feed, and 5,680 v/v/hours steam at 85 psig. The results of the catalytic conversion are given in Table I.

TABLE I

| Conversion, weight per cent | Selectivity to Olefin and Diolefin weight per cent |
|---|---|
| 44.7 | 96.0 |

EXAMPLE II

The practice of the invention was demonstrated by taking 0.52 mol of particulate ZnO with an average particle diameter of about 300 microns and admixing in a dry manner with 0.50 mol of flame-hydrolyzed ALON $Al_2O_3$ wherein the particle diameter was about 0.03 micron. The dry admixture was wet with 100 ml of deionized water, dried, pelleted into ⅛-inch pellets, calcined overnight at 1,000° C. and tested for strength in the same device as used in Example I. Pellet crushing strength was noted to be 26.2 pounds. The pellets were then impregnated in the same manner as in Example I and tested in the same catalytic reactor at the same conditions, the results of which are given in Table II.

TABLE II

| Conversion, weight per cent | Selectivity to Olefin and Diolefin weight per cent |
|---|---|
| 39.9 | 97.9 |

Analysis of the results of Table I as compared to Table II indicates that the high strength pellet of this invention demonstrated in Example II is an entirely suitable catalyst and contains approximately the same catalytic properties as the conventional low strength catalyst pellets demonstrated as a control in Example I. Thus, applicant has demonstrated that the high strength pellets of this invention are entirely satisfactory as a catalytic material.

EXAMPLE III

Additional runs were conducted in which the calcined time was varied. Specifically, in this example the same materials as in Example II were prepared in pellets in the same manner and calcined at 1,000° C. In a first run the calcining time was 1 hour and in a second run the calcining time was 16 hours. The pellets of run one, where the calcining time was 1 hour, had a crushing strength of 28 pounds when tested in the same device as in Example II, and the pellets of run two, which were subjected to a calcining time of 16 hours, exhibited a crushing strength of 26 pounds in the same device. It is noted that the catalyst pellets had a remarkably high crushing strength when calcined under these conditions.

EXAMPLE IV

Additional runs were made in which the calcining temperature was varied. Thus, the invention was practiced by preparing pellets according to the manner of Example II and calcining the pellets for 16 hours. In a first run the calcining temperature was 800° C. and in a second run the calcining temperature was 1,200° C. The tablets from the first run wherein the calcining temperature was 800° C. tested at 28 pounds crushing strength, while the tablets of the second run at 1,200° C. also tested at 28 pounds. Thus, applicant has demonstrated the production of high crush strength pellets over the indicated temperature range.

Various modifications of the invention can be made in view of the foregoing disclosure and the appended claims without departing from the spirit or scope thereof. Specifically, as noted earlier, the process for preparing the pellets can incorporate many additional steps and features without departing from the scope of the invention.

What is claimed is:

1. A method of preparing a zinc aluminate catalyst having a crush strength of at least 15 pounds measured by the apparatus of U.S. Pat. No. 2,976,723 comprising the steps of:
   a. admixing in the ratio of:
      1. one mol of particulate ZnO, wherein the average particle diameter is in the range of 0.1–1,000 microns, and
      2. about 0.7–1.1 mols of particulate flame-hydrolyzed $Al_2O_3$, said flame-hydrolyzed alumina comprising predominately gamma $Al_2O_3$, wherein the average particle diameter is in the range of about 0.01–1 micorn;
   b. pelletizing the admixture; and
   c. calcining the pellets at a temperature in the range of 600° to 1,500° C. for from 0.1 to 30 hours.

2. The method of claim 1 wherein the particle size of said ZnO is in the range of about 40–900 microns average particle diameter and the particle size of said flame-hydrolyzed $Al_2O_3$ is in the range from about 0.025–0.75 micron average particle diameter.

3. The method of claim 2 wherein said pelletized admixture is calcined at a temperature in the range of about 800°–1,200° C. for from 1–30 hours; and
   further comprising impregnating said calcined admixture with a metal catalyst.

4. The method of claim 3 further comprising the steps of:
   a. admixing in deionized water in the ratio of:
      1. about 0.52 mol of particulate ZnO, wherein said particle size is about 300 microns average particle diameter; with
      2. about 0.50 mol of particulate flame-hydrolyzed $Al_2O_3$, wherein said particle size is about 0.03 micron average particle diameter;
   b. drying said admixture;
   c. pelletizing said dried admixture into pellets;
   d. calcining said pellets at about 1,000° C. for about 16 hours;
   e. impregnating the pellets with sufficient aqueous solution to result in the impregnated pellets containing, based on the weight of the impregnated pellets, about 0.25 weight per cent platinum, about 0.25 weight per cent lithium, and about 0.15 weight per cent tin; and
   f. drying said impregnated pellets.

* * * * *